United States Patent [19]

Jones

[11] Patent Number: 4,909,372

[45] Date of Patent: Mar. 20, 1990

[54] MECHANICAL HANDLING APPARATUS

[76] Inventor: Joseph M. Jones, 17 Iscoed, Beaumaris, Anglesey, Gwynedd, Wales, Great Britain

[21] Appl. No.: 199,034

[22] PCT Filed: Sep. 22, 1987

[86] PCT No.: PCT/GB87/00665
§ 371 Date: Jul. 19, 1988
§ 102(e) Date: Jul. 19, 1988

[87] PCT Pub. No.: WO88/02344
PCT Pub. Date: Apr. 7, 1988

[30] Foreign Application Priority Data

Sep. 23, 1986 [GB] United Kingdom ............... 8622825

[51] Int. Cl.⁴ .............................................. B65G 13/00
[52] U.S. Cl. .................................. 193/35 SS; 198/721
[58] Field of Search ....................... 193/35 SS, 35 C; 198/837, 838, 860.1, 860.3, 721; 414/529

[56] References Cited

U.S. PATENT DOCUMENTS

| 3,545,596 | 12/1970 | Turnbough | 198/721 |
| 4,205,740 | 6/1980 | Hammond | 193/35 SS X |
| 4,545,477 | 10/1985 | Besch | 198/860.1 X |
| 4,823,927 | 4/1989 | Jensen | 193/35 SS |

FOREIGN PATENT DOCUMENTS

| 3436129 | 4/1986 | Fed. Rep. of Germany . | |
| 1432795 | 2/1966 | France . | |
| 2446783 | 8/1980 | France | 198/860.1 |
| 2566750 | 1/1986 | France | 193/35 SS |
| 0233537 | 3/1986 | German Democratic Rep. | 198/860.1 |
| 2190641 | 11/1987 | United Kingdom | 193/35 SS |

Primary Examiner—Robert J. Spar
Assistant Examiner—Lyle Kimms
Attorney, Agent, or Firm—Shapiro and Shapiro

[57] ABSTRACT

A mechanical handling apparatus has a top plate covering a raisable and lowerable roller bed and resiliently secured in place such that the plate may shift longitudinally of the roller bed under load, but resiliently return to substantially its original position when the load is removed.

14 Claims, 1 Drawing Sheet

MECHANICAL HANDLING APPARATUS

The invention relates to mechanical handling apparatus.

Such apparatus often comprises an elongate track having an air bag housed within it, and the air bag supports, and raises lowers a roller bed which in turn raises and lowers a. In practice the apparatus is often subject to uneven loads, which can cause instability. Also, the top plate covering the roller bed in such an apparatus may be subject to longitudinal stresses when a load is drawn over it.

Accordingly, the invention provides a body for mechanical handling apparatus, including means which obviates rotation of the apparatus in a direction about the longitudinal axis of the apparatus. The invention also provides an arrangement for resiliently securing the top plate covering the roller bed, thus permitting resilient displacement of the top plate.

An embodiment of the invention is hereinafter described, by way of example, with reference to the accompanying drawings.

Figure 1:
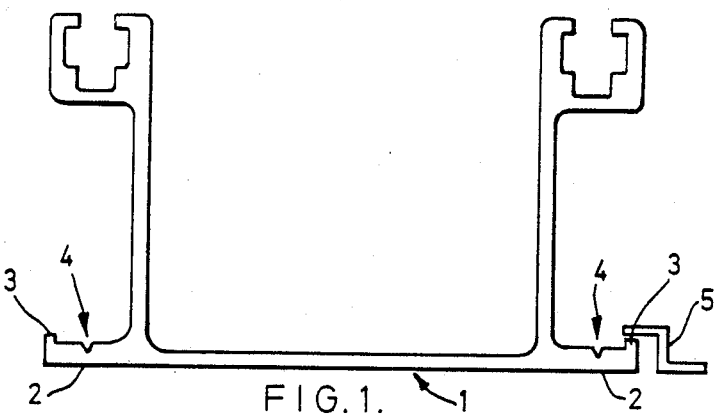
FIG. 1 is a transverse cross-sectional view of channel section.

Referring to FIG. 1 of the drawings, a mechanical handling apparatus according to the invention may include a body of extruded aluminium channel section 1 which in use houses an air bag and a roller cradle (both not shown in FIG. 1) and which has at either side an integral projecting flange 2 which is flat and which has an edge rib 3 which is upstanding and is substantially vertically arranged. The flange 2 has a groove 4 of substantially V-shape cross-section. The flat flange 2 ensures that the channel section is stable on a substrate.

In use, the channel section 1 is secured to a substrate by clamping means 5, which may be releasable, which means locates over and grips the upstanding rib 3 to obviate rotation of the section 1 about the longitudinal axis of the section. The mechanical handling apparatus incorporating the section is then stable, even under conditions of uneven loading.

Figure 2:
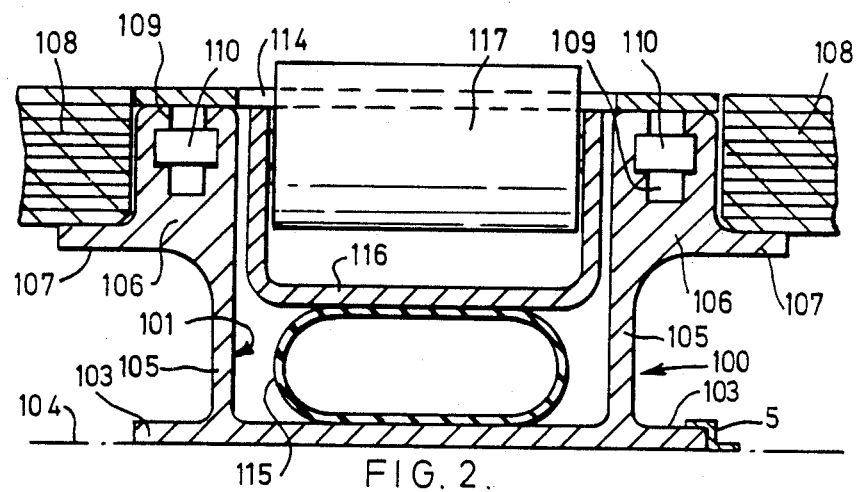
FIG. 2 is a transverse cross-sectional view of a further channel section member according to the invention in use.

FIG. 2 shows a mechanical handling apparatus 100 in accordance with the invention. The apparatus includes a channel section 101 which has an integral flat projecting flange 103, for mounting on a substrate 104, at each side. The flange 103 co-operates with retaining means such as clips like those 5 of the FIG. 1 embodiment.

There is thus no tendency for the apparatus to rotate in use.

Figure 3:
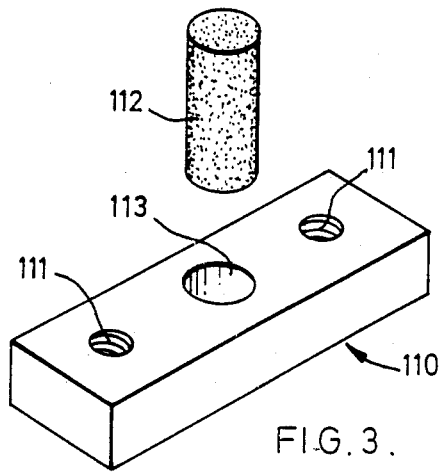
FIG. 3 is a detail of FIG. 2, enlarged.

The channel 101 is an integral unit which has upstanding side legs or walls 105 which have at their free ends enlarged bosses 106 from which project further flanges 107 intermediate the length of the walls 105 on which a load supporting floor 108 of say a vehicle is supported. The floor 108 comprises planks or boards of, for example, wood. The bosses have open slots cruciform in cross-section in the embodiment, extending the length thereof. Inserted in the slots 109 are several separate retaining means 110 (FIG. 3) comprising a bar with two lateral screw or nut holes 111 and a central hole 113 through which a resilient means 112 in the form of a rubber plug is inserted to protrude from below the bar. When the retaining means 110 is inserted in the slot 109, the rubber plug 112 is compressed slightly, and grips opposite sides of the slot 109. The retaining means 110 is thus resiliently held in the slot at the required position. A top plate 114 can then be secured by inserting screws or nuts through holes therein aligned with the holes 111, which are threaded to receive them.

The top plate 114 sometimes has a tendency to move slightly longitudinally when a load is drawn over it. The plug 112 allows this movement by resiliently "giving", and returning to the original position when the load is removed. The plug 112 thus grips slot 109 but allows "floating" of the top plate 114.

There are several retaining means 110 spaced apart along the channel member. Alternatively, there may be a single retaining means 110 which extends over substantially the whole length of the slot 109, there being several plugs 112 through such a means.

There will be, it will be understood, a retaining means in both slots 109.

Instead of a plug 112 of rubber, it may be of any other suitable material, or indeed may be replaced by a spring clip of U- or C-shape which extends around the nut to spring against the opposite walls of the slot.

There is in this channel 101 an inner channel 116 supported on inflatable means such as an air bag 115, the inner channel comprising a cradle supporting rotatable means such as rollers 117 which rise through aligned openings in the top plate 114 when the bag 115 is inflated in order to allow passage of a load such as a pallet over the floor 108. When the bag 115 is deflated, the rollers 117 sink below the floor 108 so making the conveyor apparatus "dead" with the load in the required position.

I claim:

1. Mechanical handling apparatus, comprising:
   a main housing of channel section having a base and upstanding sidewalls,
   inflatable means disposed within said main housing channel section and extending over the length thereof,
   a top plate supported by free upper end portions of said sidewalls and covering the underlying interior of said main housing channel section, said top plate having roller-accommodating through holes at spaced locations along the length thereof,
   means supporting spaced apart rollers in said main housing channel section in vertical alignment with said through holes of said top plate such that when the inflatable means is inflated, the rollers are raised to project through said through holes for transporting a load, and
   means resiliently securing said top plate to said upper end portions of said sidewalls for permitting said top plate to shift longitudinally of said main housing channel section under load and for resiliently restoring said top plate to substantially its original position when the load is removed.

2. Mechanical handling apparatus according to claim 1, wherein said securing means comprises longitudinal slots formed in said upper end portions of said sidewalls, securing members received in said slots and secured to said top plate, and resilient members resiliently supporting said securing members within said slots.

3. Mechanical handling apparatus according to claim 2, wherein said resilient members are made of compressible elastic material and are compressively engaged with said slots.

4. Mechanical handling apparatus according to claim 3, wherein said top plate is fixedly connected to said securing members.

5. Mechanical handling apparatus according to claim 4, wherein said longitudinal slots are of substantially cruciform shaped transverse cross-section and upwardly open, said securing members are fitted within laterally oriented sections of said slots, and said resilient members are compressively engaged with upwardly oriented sections of said slots.

6. Mechanical handling apparatus according to claim 5, wherein said securing members are formed with openings in which portions of said resilient members are received.

7. Mechanical handling apparatus according to claim 6, wherein said resilient members comprise elastic plugs having portions protruding from said openings.

8. Mechanical handling apparatus according to claim 1, wherein said securing means comprises recesses formed in said upper end portions of said sidewalls, respective resilient members received in said recesses, and means securing said resilient members to said top plate.

9. Mechanical handling apparatus according to claim 8, wherein said resilient members are compressively engaged with said recesses.

10. Mechanical handling apparatus, comprising:
means supporting a plurality of rollers for raisable and lowerable movement relative to a load supporting surface between a pair of sidewalls of an elongate roller bed,
a top plate supported on said sidewalls and covering said roller bed, said top plate having through holes therein for accommodating said rollers when said rollers are raised by said supporting means, and
means resiliently securing said top plate to said sidewalls for permitting said top plate to shift longitudinally of said roller bed under load and for restoring said top plate to substantially its original position when the load is removed.

11. Mechanical handling apparatus according to claim 10, wherein said securing means comprises longitudinal slots extending along said sidewalls, securing members received in said slots and secured to said top plate, and resilient members resiliently supporting said securing members within said slots.

12. Mechanical handling apparatus according to claim 11, wherein said slots are of substantially cruciform shaped transverse cross-section and upwardly open, said securing members are fitted within laterally oriented sections of said slots, and said resilient members are compressively engaged in upwardly oriented sections of said slots.

13. Mechanical handling apparatus according to claim 12, wherein said securing members are formed with openings in which portions of said resilient members are received, and said resilient members comprise elastic plugs having respective portions received by said openings of said securing members and respective portions protruding from said securing members and compressively engaging said upwardly oriented sections of said slots.

14. Mechanical handling apparatus according to claim 10, wherein said securing means comprises recesses disposed longitudinally along said sidewalls, respective resilient members retained within said recesses, and means securing said top plate to said resilient members.

* * * * *